United States Patent
Nangia et al.

(10) Patent No.: US 7,139,237 B2
(45) Date of Patent: Nov. 21, 2006

(54) METHOD AND SYSTEM FOR MULTIRATE MULTIUSER MODULATION

(75) Inventors: Vijay Nangia, Schaumburg, IL (US); Kevin Lynn Baum, Rolling Meadows, IL (US); Karthik Ramasubramanian, Sunnyvale, CA (US)

(73) Assignee: Motorola, Inc., Schaumburg, IL (US)

( * ) Notice: Subject to any disclaimer, the term of this patent is extended or adjusted under 35 U.S.C. 154(b) by 1020 days.

(21) Appl. No.: 09/961,516

(22) Filed: Sep. 24, 2001

(65) Prior Publication Data

US 2002/0118765 A1     Aug. 29, 2002

(51) Int. Cl.
    *H04J 13/02*       (2006.01)
(52) U.S. Cl. .................... 370/208; 370/330; 370/430
(58) Field of Classification Search ............... 370/203, 370/208, 330, 430, 441, 343–344
    See application file for complete search history.

(56) References Cited

U.S. PATENT DOCUMENTS

| | | | | |
|---|---|---|---|---|
| 6,067,326 A | * | 5/2000 | Jonsson et al. | 375/286 |
| 6,473,418 B1 | * | 10/2002 | Laroia et al. | 370/344 |
| 6,522,700 B1 | * | 2/2003 | Zimmermann et al. | 375/295 |
| 6,898,198 B1 | * | 5/2005 | Ryan et al. | 370/338 |

OTHER PUBLICATIONS

Michael Schnell and Isabella De Broeck; "Application of IFDMA to Mobile radio Transmission"; IEEE International Conference on Universal Personal Communications, ICUPC, 1998; vol. 2; pp. 1267-1272.

Uli Sorger, Isabella De Broech and Michael Schnell; "Interleaved FDMA—A New Spread-Spectrum Multiple-Access Scheme"; IEEE International Conference on Communications, ICC 1998, vol. 2; pp. 1013-1017.

Michael Schnell and Isabella De Broech; "Interleaved FDMA: Equalization and Coded Performance in Mobile Radio Applications"; IEEE International Conference on Communications, ICC 1999; vol. 3; pp. 1939-1944.

* cited by examiner

*Primary Examiner*—Ricky Q. Ngo
*Assistant Examiner*—Richard Chang

(57) ABSTRACT

A multi-rate interleaved frequency division multiple access (IFDMA) modulation scheme permits users to transmit at different data rates or to vary their data rates while providing frequency diversity and preserving low peak-to-average power ratios and orthogonality between users at different data rates. The modulation scheme allows user-specific data block and repetition sizes, as well as user-specific modulation codes. Code assignment rules are provided for maintaining orthogonality between users having different data rates. Block and phase ramp modulation codes can be used. Asynchronous transmissions by users are supported by ensuring that the length of the cyclic extension is sufficiently long to tolerate worst case relative signal arrival delays between users and the channel pulse response duration over the communication medium. The modulation scheme can be employed in wireless communication systems, such as cellular or paging systems.

43 Claims, 7 Drawing Sheets

| USER REQUIREMENTS | | MULTI-RATE IFDMA | | | | |
|---|---|---|---|---|---|---|
| USER | DATA RATE REQUIREMENT | DATA BLOCK SIZE | No. BLOCK REPETITIONS, L | DATA RATE ALLOCATED | CHANNELIZATION CODE | |
| | | | | | BLOCK | PHASE RAMP |
| A | $R_s/2$ | $N/2$ | 2 | $R_s/2$ | $c_{2,0}$ | $\theta_{2,0}$ |
| B | $R_s/4$ | $N/4$ | 4 | $R_s/4$ | $c_{4,1}$ | $\theta_{4,1}$ |
| C | $R_s/8$ | $N/8$ | 8 | $R_s/8$ | $c_{8,3}$ | $\theta_{8,3}$ |
| D | $R_s/8$ | $N/8$ | 8 | $R_s/8$ | $c_{8,7}$ | $\theta_{8,7}$ |

METHOD AND SYSTEM FOR MULTIRATE MULTIUSER MODULATION

TECHNICAL FIELD OF THE INVENTION

The invention relates generally to wireless communications, and in particular, to an improved modulation scheme for a wireless system.

BACKGROUND OF THE INVENTION

A challenging aspect of designing advanced cellular systems is the development of a flexible and efficient physical layer modulation scheme. Some of the desirable attributes of a physical layer include: moderate peak-to-average power ratio, to reduce the cost, size, and power consumption of subscriber-unit power amplifiers; support for a wide range of data rates, and the ability to vary data rates based on received signal quality; support for adaptive modulation; support for frequency diversity of wideband channels (e.g., 20 MHz), even when transmitting at "narrowband" data rates; and the ability to maintain orthogonality between transmissions by different users in a cell, in order to minimize intra-cell interference and maximize capacity.

Interleaved frequency division multiple access (IFDMA) is a multicarrier modulation method that could potentially satisfy many of the above-listed criteria for a physical layer. IFDMA takes some of the desirable characteristics of both orthogonal frequency division multiplex (OFDM) and single carrier modulation and combines them into an improved type of modulation. With IFDMA, the baseband signal begins as a single-carrier quadrature phase shift keying (QPSK) or quadrature amplitude modulation (QAM) symbol stream. Since IFDMA starts as a single carrier scheme (prior to blocking and repetition), it has the same peak-to-average ratio as single carrier modulation, and provides frequency diversity. However, in the IFDMA scheme, every user must transmit with the same number of subcarriers. This prevents the use of different data rates by different users and limits the flexibility of IFDMA in an advanced communication system.

Therefore, there is a need for an improved modulation scheme that provides a high degree of data rate flexibility, while preserving orthogonality and a low peak-to-average ratio.

DETAILED DESCRIPTION OF THE PRESENTLY PREFERRED EMBODIMENTS

It is an advantage of the present invention to provide a significantly improved multirate multiuser modulation technique. The present invention provides an IFDMA-type modulation scheme that enables different users in a communication system to transmit simultaneously at different data rates (or different effective bandwidths), while providing frequency diversity and preserving low peak-to-average power ratios and the orthogonality between the users. Additionally, the improved modulation scheme permits transmitters within the system to vary their data rates (or effective bandwidths), while preserving low peak-to-average power ratios and orthogonality.

The present invention avoids large peak-to-average ratios by modulating each multirate user with a single orthogonal code, thereby maintaining the low peak-to-average ratios normally associated with single-carrier systems.

System and Transmitter Signal Processing

Figure 1:
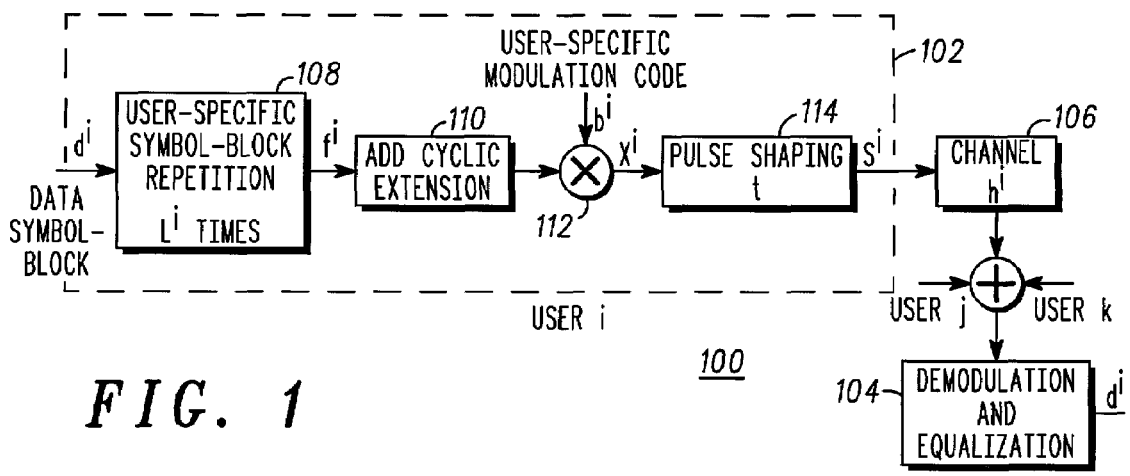
FIG. 1 is a block diagram of a system in accordance with the present invention.

FIG. 1 is a block diagram of an exemplary system 100 in accordance with the present invention. The system 100 includes one or more transmitters 102, each corresponding to particular user, communicating with one or more receivers 104 by way of a communication channel 106. The communication channel 106 can be a radio frequency (RF) channel in a multi-user communication system, such as a cellular system, paging system, mobile radio system, or the like. Multiple users, such as User i, User j, and User k, as illustrated, can simultaneously transmit data over the channel 106. The transmitters 102 and receivers 104 can be mobile subscriber units, such as mobile phones and pagers, and/or base stations. The transmitters 102 and receivers 104 can include suitable combinations of hardware and/or software components for implementing the modulation scheme of the present invention. As shown, the User i transmitter 102 illustrated in FIG. 1 includes a block repeater 108, a cyclic extension device 110, a modulator 112, and a pulse-shaping filter 114. As will be described in further detail below, the receiver 104 includes processes for demodulating and equalizing received signals.

The system 100 is described further herein for the case where users within the IFDMA-type system can have different data rates. Two coding techniques (block and phase ramp modulation codes) of achieving orthogonal discrimination for different data rates are disclosed. The conditions for maintaining orthogonality, i.e., no multiple access interference (MAI), between the different users are also described in detail.

With IFDMA, the baseband signal begins as a single-carrier phase shift keying (PSK) or quadrature amplitude modulation (QAM) symbol stream. The symbols are grouped into blocks which are repeated L times prior to filtering (typically with a root-raised cosine filter) and transmission, where L is an integer. The repetition of the symbol blocks causes the spectrum of transmitted signal to be non-zero only at certain subcarrier frequencies (namely, every $L^{th}$ subcarrier). Thus, the transmitted signal spectrum before pulse shaping is similar to what would be seen if data symbols were only modulated on every $L^{th}$ subcarrier of an orthogonal frequency division modulation (OFDM) signal. In particular, this type of OFDM transmission is sometimes called comb OFDM. However, after pulse shaping, the IFDMA spectrum drops off faster compared to OFDM. Since the signal occupies only one of every L subcarriers, a total of L different users can transmit simultaneously. The present invention is also applicable to the case of different users using different constellation sizes (e.g. QPSK, M-ary QAM, 8-PSK).

The IFDMA transmissions remain orthogonal as long as: 1) they occupy different sets of subcarriers, which is accomplished by user-specific modulation codes, 2) a cyclic extension (or guard period) is added to the transmission, where the cyclic extension is longer than the channel pulse response, and 3) the signals are synchronized with the receiver 104 in time and frequency.

Figure 2:
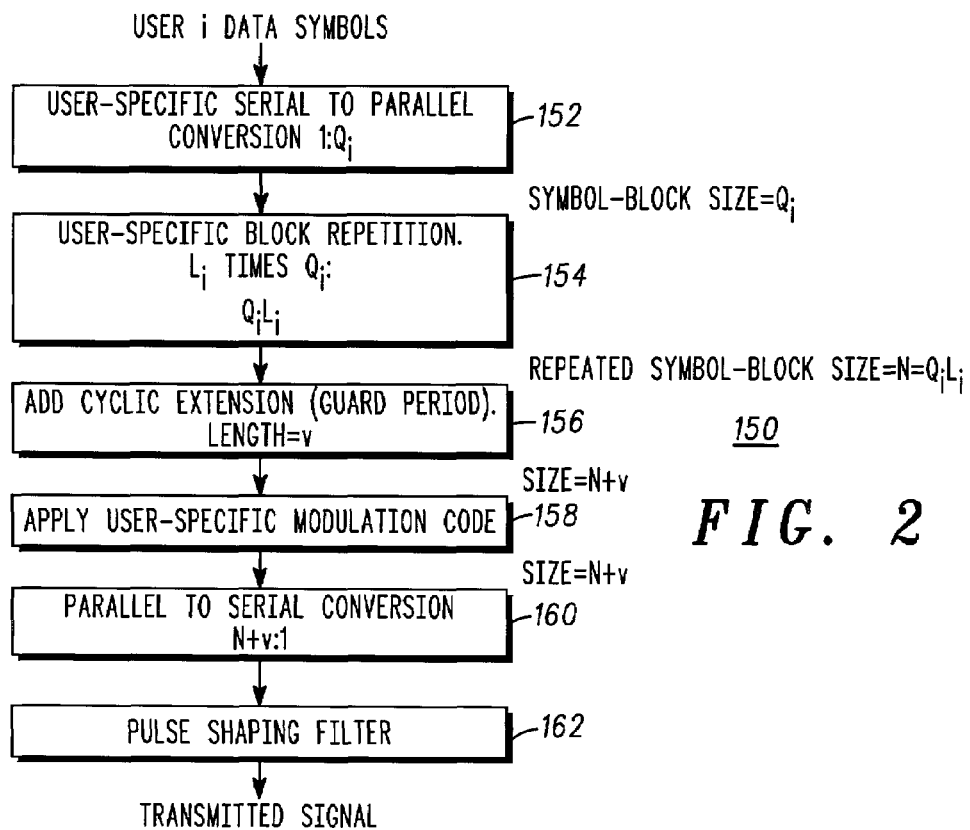
FIG. 2 is a flow chart illustrating the operation of the transmitter of the system shown in FIG. 1.

Turning now to FIG. 2, there is shown a flowchart 150 illustrating an example of the operation of the transmitter 102 of FIG. 1. For each active user i, (i=1, . . . ,K, within a single cell of the mobile communication system 100, block transmission of $Q_i$ data symbols, $d^{(i)}=[d_0(i), d_1(i), \ldots , d_{(Q_i-1)}(i)]$ is performed.

Figure 3:
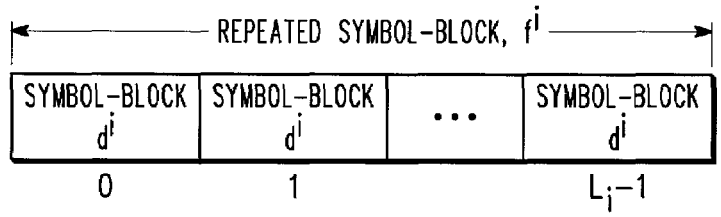
FIG. 3 illustrates an exemplary repeated symbol-block.

In step 152, data symbols for user i are converted from a serial symbol form to a parallel symbol format and then received by the block repeater 108. In step 154, a symbol block is formed by block repetition of $Q_i$ data (e.g. QAM) symbols ($L_i$ times). A user-specific block repetition rate is used. The block repetition increases the bandwidth occupied of the transmitted signal by $L_i$ and causes its spectrum to be non-zero only at every $L_i^{th}$ subcarrier frequency (subcarrier spacing=$1/Q_iL_i$). An example of a repeated symbol-block is shown in FIG. 3.

In step 156 of FIG. 2, a guard period (a cyclic extension comprising a prefix, postfix, or both) is added prior to modulation and pulse shaping of the repeated symbol-block. When a cyclic prefix of length v is used and the time is indexed from −v to $Q_iL_i-1$, the elements of the repeated symbol-block, $f^i$, are $$f_l^i = d_{(l\, mod\, Q_i)}^i l=0 \ldots (Q_iL_i-1) \quad (1)$$

In step 158, a user-specific modulation code is applied by the modulator 112. The modulation code can be any suitable code meeting the code assignment conditions disclosed herein. After applying the user-specific modulation code, the transmitted symbol vector becomes $$x_{lQ_i+q}^i = f_{lQ_i+q}^i \cdot b_{lQ_i+q}^i = d_q^i \cdot b_{lQ_i+q}^i l=0 \ldots (L_i-1), q=0 \ldots (Q_i-1)\ x_{-l}^i = f_{Q_iL_i-l}^i \cdot b_{-l}^i l=1 \ldots v \quad (2)$$

where $b_l^i$ is the modulation code assigned to user i with data rate $R_i$ (proportional to $Q_i$).

In the following description, data rate is defined as the ratio of the number of symbols in a symbol-block to the total number of symbols in the repeated symbol-block, i.e., $$\text{data rate} = \frac{\text{number of symbols in symbol-block}}{\text{total number of symbols in repeated symbol-block}}$$

With proper selection of modulation codes and user data rates, orthogonality between the different data rate users can be maintained even in multipath conditions as long as the channel varies slowly with respect to the repeated symbol-block duration. To maintain orthogonality, the repeated symbol-block duration can be the same for all users, i.e., $$N=Q_iL_i \forall i \quad (3)$$

In step 160, a parallel-to-serial conversion is performed on the symbol vector. The serialized vector is then filtered using the pulse-shaping filter 114 (step 162) before being transmitted on the channel 106.

The present invention provides for multirate transmissions by using user-specific data block and repetition sizes, as well as user-specific modulation codes, thereby providing different data rates to different users and hence a high degree of data rate flexibility. It also preserves a low peak-to-average ratio and provides two choices for the user-specific modulation codes (block and phase-ramp modulation codes). These modulation codes maintain the orthogonality (i.e., little or no MAI) between the different data rates even in a multipath channel.

Now, consider an exemplary system with bandwidth B and four users with different data rate requirements. Let Rs be the maximum data rate that can be achieved by a single user occupying the entire bandwidth B. The user-specific data rate requirements are given in table 180 of FIG. 4. Also tabulated are the user-specific parameters and possible code assignments for the multi-rate IFDMA of the present invention. The present invention can completely satisfy the different data requirements by assigning user-specific symbol-block and repetition sizes and user-specific modulation codes to the different users as shown in table 180.

Figures 4, 5:
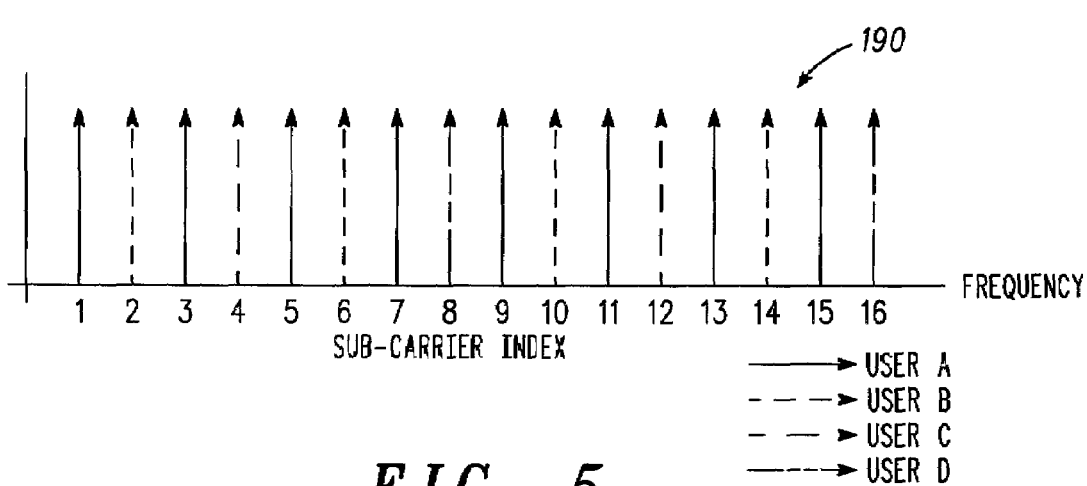
FIG. 4 is a table illustrating the characteristics of the modulation scheme employed by the system of FIG. 1.
FIG. 5 is a frequency chart illustrating the subcarriers occupied by users of the system of FIG. 1 under an exemplary operating scenario.

In the frequency domain, the modulation codes have the effect of interleaving the spectrum of the various multirate users of the system 100. An example of the interleaving is illustrated in FIG. 5. Specifically, FIG. 5 shows a graph 190 of the subcarriers occupied by four users of the modulation scheme disclosed herein. As seen from FIG. 5, the higher data rate user (user A) is allocated more bandwidth (subcarriers) than the other lower data rate users (users B,C,D). The present invention is not limited to the number of users or subcarrier allocations illustrated by the example of FIG. 5.

Receiver Signal Processing

Figure 6:
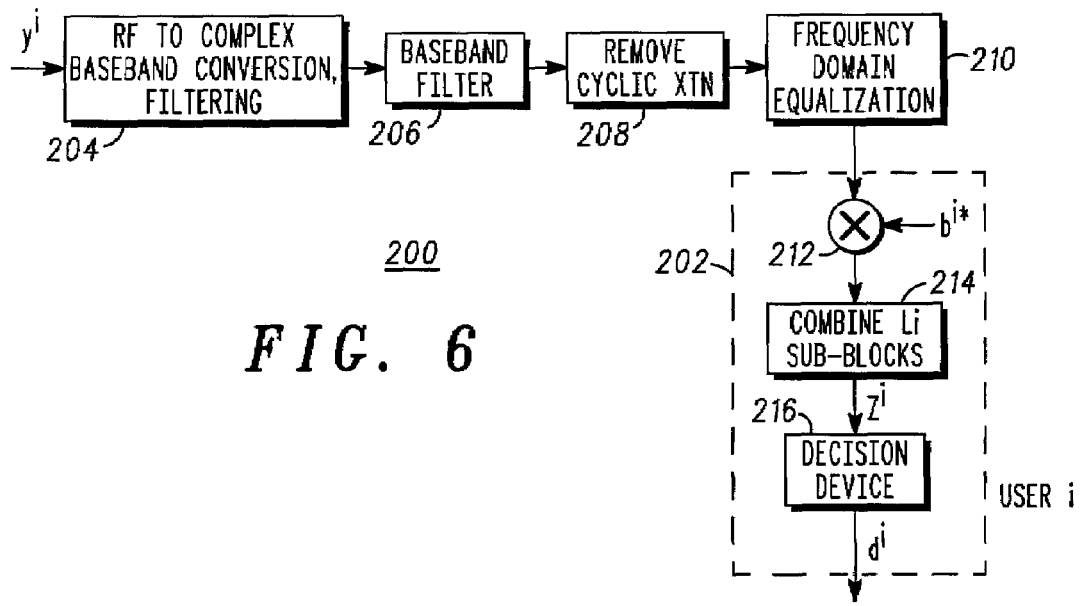
FIG. 6 is a block diagram of a first exemplary receiver usable in the system shown in FIG. 1.
Figure 8:
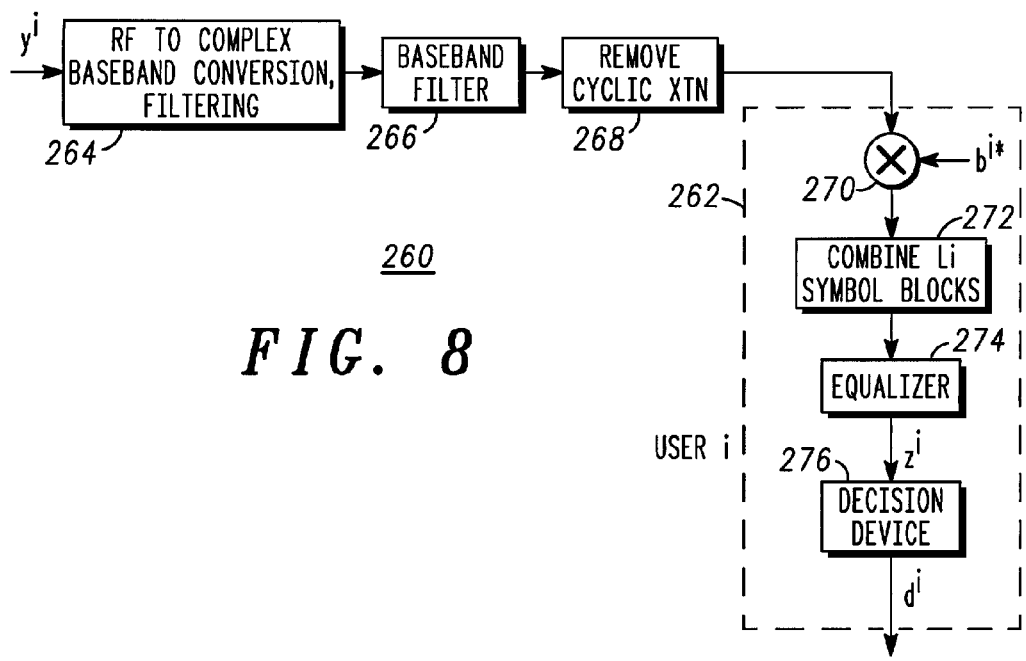
FIG. 8 is a block diagram illustrating a second exemplary receiver usable in the system shown in FIG. 1.

FIG. 6 and FIG. 8 show two alternative receiver architectures usable as the receiver 104 of FIG. 1. Each of these architectures is discussed below in further detail. However, the general operation of the receiver 104 is described first. The complex envelope of the combined received signal from K users after propagating through the multipath channel 106 and being corrupted by additive white gaussian noise is given by, $$y_l = \sum_{j=1}^{K} \sum_{m=0}^{M} x_{l-m}^j \cdot p_m^j + n_l \quad l = -v \ldots (N-1) \quad (4)$$

where $p_l^i = t_l^i * h_l^i * r_l$ is the equivalent baseband channel pulse response (CPR) for user i (dimension=M+1), with $h_l$=equivalent low-pass channel impulse response, $t_l$=equivalent transmitter baseband pulse, $r_l$=equivalent receiver baseband pulse, and $n_l$=receiver noise (AWGN).

The receiver 104 can select the last N samples (i.e after the cyclic extension removal) of the received signal in Eq. (4) to demodulate the user data. The demodulation process for user i consists of equalization of the channel pulse response, $p_l^i$, modulation code correlation, $b_l^i$, and combining of the $L_i$ repetitions. Depending on the order of the operations, two receiver structures are possible as described below.

First Receiver Architecture

FIG. 6 shows the first receiver structure 200. In this architecture, the channel equalization is performed prior to correlating the signal with the user-specific modulation code. The first receiver 200 includes a RF to complex baseband conversion circuit 204, which includes an A/D converter/sampling circuit, a baseband filter 206, a cyclic extension remover 208, an equalizer 210, a demodulator 212, a symbol-block combiner 214, and a symbol decision device 216. The demodulator 212, symbol-block combiner 214, and symbol decision device 216 perform their functions for specific users.

Figure 7:
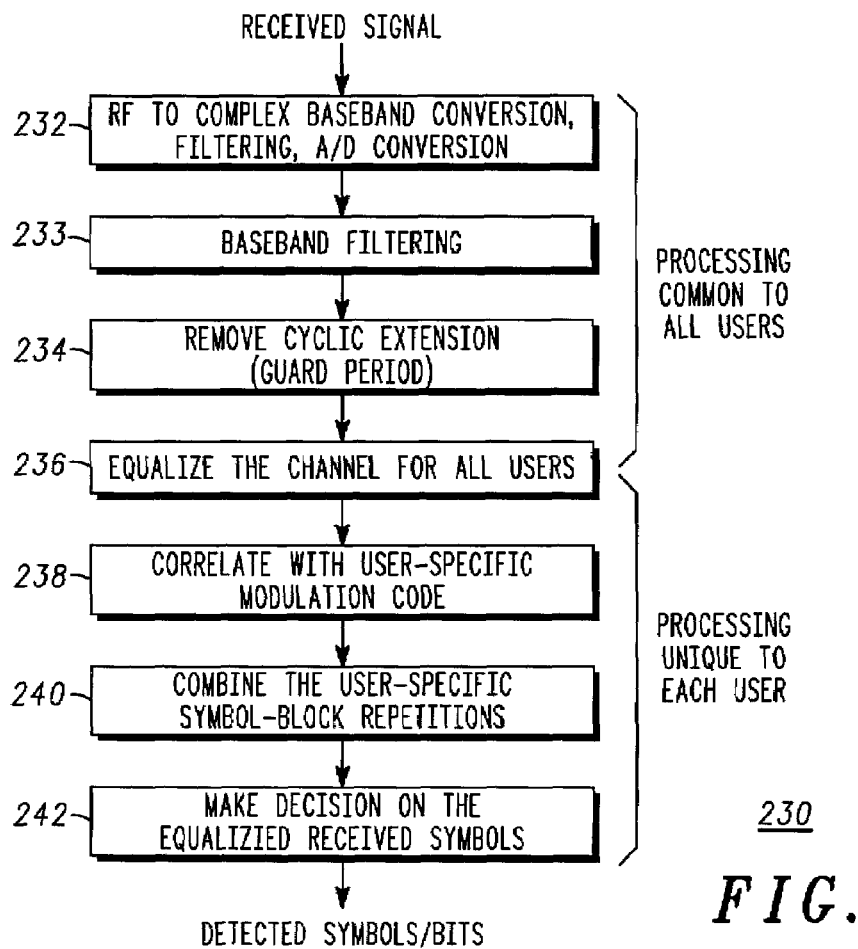
FIG. 7 is a flow chart illustrating the operation of the first receiver shown in FIG. 6.

FIG. 7 is a flow chart 230 illustrating the operation of the first receiver 200. In step 232, the received signal is down converted to a complex baseband signal, filtered (image rejection, adjacent channel rejection, avoid aliasing) and digitized by the A/D converter/sampling circuit 204. In step 233, the baseband signal is baseband filtered—typically a match filter matched to the transmit pulse shaping filter. In step 234, the cyclic extension is removed.

In step 236, the sampled baseband combined received signal (after cyclic extension removal –N samples for 1× oversampling in the receiver) from all users is equalized for each user's channel response using a frequency domain equalization technique. As each user is using an orthogonal set of sub-carriers (due to user-specific block repetitions and modulation codes), all users can be equalized simultaneously in the frequency domain using only one N-point transform. However, the equalizer coefficients are different for each user and are applied only to the sub-carriers occupied by that user. Hence, step 236 performs a combination of common processing and user-specific processing. Alternatively the equalization can be based on other techniques such as linear transversal time-domain equalizer, decision feedback equalizer, maximum likelihood sequence estimation, iterative equalizer, inter-symbol-interference (ISI) canceller, and turbo equalizer.

In step 238, for each user, the equalized signal is then code correlated by the demodulator 212. In step 240, the correlated signal is combined resulting in an soft estimate of the $Q_i$ transmitted symbols, $z^{(i)}$. The soft decisions can be passed to a Forward Error Correction (FEC) decoder if error correction coding was used in the transmitter. In step 242, a logic decision is made based on the estimated symbols to determine the values of the symbols. The symbols can each include one or more bits.

Second Receiver Architecture

FIG. 8 shows the second receiver structure 260. In this architecture, the correlation with user-specific codes is performed prior to channel equalization. The second receiver 260 includes a RF to complex baseband conversion circuit 264, which includes an A/D converter/sampling circuit, a baseband filter 266, a cyclic extension remover 268, a demodulator 270, a symbol-block combiner 272, an equalizer 274, and a symbol decision device 276. The demodulator 270, symbol-block combiner 272, equalizer 274, and symbol decision device 276 perform their functions on a user-specific basis.

Figure 9:
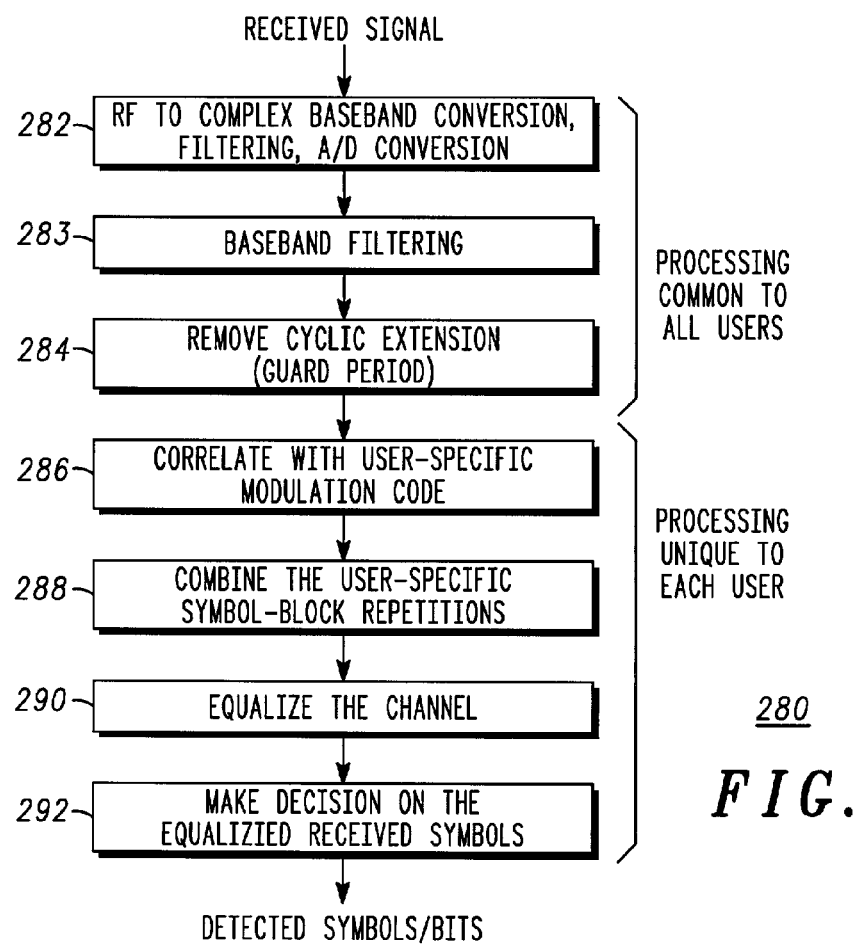
FIG. 9 is a flow chart illustrating the operation of the second receiver of FIG. 8.

FIG. 9 is a flow chart 280 illustrating the operation of the second receiver 260. FIG. 9 shows the receiver signal processing for this type of receiver structure 260.

In step 282, the received signal is down converted to a complex baseband signal, filtered (image rejection, adjacent channel rejection, avoid aliasing) and digitized by the A/D converter/sampling circuit 264. In step 283, the baseband signal is baseband filtered, typically a match filter matched to the transmit pulse shaping filter. In step 284, the cyclic extension is removed.

In step 286, for each user, the sampled baseband combined signal (after cyclic extension removal) from all users is correlated by the demodulator 270. In step 288, the correlated signal is combined using the user-specific block repetitions. The resulting signal ($Q_i$ samples for 1× receiver oversampling) is then equalized (time or frequency domain) resulting in an estimate of the $Q_i$ transmitted symbols, $z^{(i)}$ (step 290). Equalization can be achieved using various techniques including linear transversal time-domain equalizer, decision feedback equalizer, maximum likelihood sequence estimation, linear frequency domain equalizer, iterative equalizer, ISI canceller, and turbo equalizer. If frequency domain equalization is used, a Qi point transform is needed for each user. In step 292, a logic decision is made based on the estimated symbols to determine the values of the symbols. The symbols can each include one or more bits.

Receiver Analysis

The following analysis is based on the first receiver 200 in FIG. 6. However, the analysis results derived herein are also valid for the second receiver 260 shown in FIG. 8.

The analysis is as follows. Let $g_l^{ij}$ be the response of the $j^{th}$ user channel pulse response, $p_l^j$, to the equivalent $i^{th}$ user equalization filter, $e_l^i$, i.e., $g_l^{ij} = p_l^j * e_l^i$. Thus, the equalized received signal samples for user i are given by, $$z_l^i = \sum_{j=1}^{K} \sum_{m=0}^{M} x_{l-m}^j \cdot g_m^{ij} + \tilde{n}_l \quad l = 0 \ldots (N-1) \tag{5}$$

For deriving the conditions for orthogonal user discrimination, noise free transmission ($n_l$=0) is assumed. Thus, $$z_l^i = \sum_{j=1}^{K} \sum_{m=0}^{M} x_{l-m}^j \cdot g_m^{ij} \quad l = 0 \ldots (N-1) \tag{6}$$

An estimate of the transmitted $Q_i$ data symbols of user i is obtained by correlating the equalized received signal samples with the corresponding $i^{th}$ user modulation code, $b_l^i$, and combining the information in the $L_i$ repetitions as follows, $$\hat{d}_q^i = \sum_{l=0}^{L_i-1} z_{lQ_i+q}^i \cdot (b_{lQ_i+q}^i)^* \quad q = 0 \ldots (Q_i - 1) \tag{7}$$

$$= \sum_{j=1}^{K} \sum_{m} g_m^{ij} \sum_{l=0}^{L_j-1} x_{lQ_i+q-m}^j \cdot (b_{lQ_i+q}^i)^*$$

Selection of Modulation Codes

Two types of modulation codes are described herein, block and phase ramp. The following description derives the conditions and codes required for maintaining orthogonality between the different data rate users in the system 100.

Block Modulation Codes

Let the modulation code for user i, $b_l^i$, be of the following form, $$b_{lQ_i+q}^i = c_l^i \quad q=0 \ldots (Q_i-1), \quad l=0 \ldots (L_i-1) \quad b_{-q}^i = b_{N-q}^i \quad q=1 \ldots v \tag{8}$$

where the properties (and values) of the channelization code vector $c_{L_i,i} = c_{L_i}^i = [c_0^i \; c_1^i \; \ldots \; c_{L_i-1}^i]$ for orthogonal user discrimination are to be determined as follows.

Figure 10:
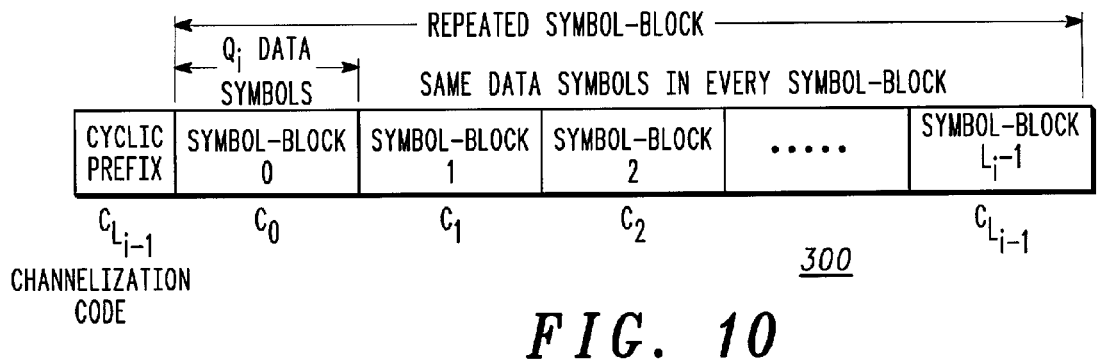
FIG. 10 illustrates an exemplary sequence of symbol-blocks transmitted over a channel.

It can be seen from Eq. (8), that the modulation codes for user i, $b_l^i$, takes on only $L_i$ different values and is constant ($c_l^i$) for all data symbols in the $l^{th}$ repetition of a symbol-block, $f_{lQ_i+q}^i$ $q=0 \ldots (Q_i-1)$, within a repeated symbol-block, as shown in block sequence 300 of FIG. 10. Thus, from Eq. (2) and Eq. (8), $$x_{lQ_i+q}^i = d_q^i \cdot b_{lQ_i+q}^i = d_q^i \cdot c_l^i \quad l=0 \ldots (L_i-1), \; q=0 \ldots (Q_i-1) \tag{9}$$

or, $$x_l^i = d_{(l)Q_i}^i \cdot c_{(\lfloor \frac{l}{Q_i} \rfloor)_{L_i}}^i \quad l = 0 \ldots (N-1) \tag{10}$$

where, $(a)_b = a \mod b$ and $$\left\lfloor \frac{a}{b} \right\rfloor = \text{floor}\left(\frac{a}{b}\right)$$

is the flooring function. Using Eq. (8) in Eq. (7), an estimate of the transmitted $Q_i$ data symbols of user i using block modulation codes is given as, $$\hat{d}_q^i = \sum_{j=1}^{K} \sum_{m} g_m^{ij} \sum_{l=0}^{L_i-1} x_{lQ_i+q-m}^j \cdot (c_l^i)^* \quad q = 0 \ldots (Q_i - 1) \tag{11}$$

Now, consider the case where the data rate of user i is an integer multiple of user j, i.e., $$Q_i = w_{ij} Q_j \quad w_{ij} = \text{positive interger} \tag{12}$$
$$L_j = w_{ij} L_i$$

Figure 11:
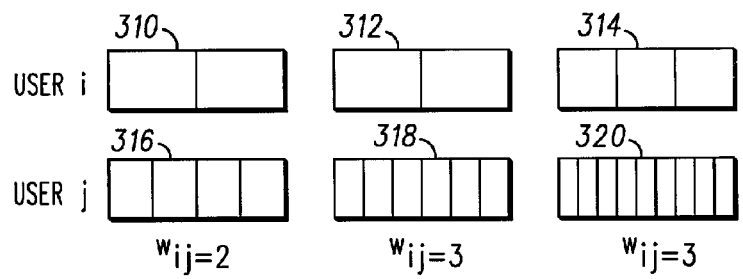
FIG. 11 illustrates exemplary symbol-block repetitions for multiple users of a system.

Thus, from Eq. (12), as the repeated symbol-block duration (N) is the same for all users, the number of data block repetitions for user i ($L_i$) is $w_{ij}$ times smaller than that for user j ($L_j$), as illustrated in FIG. 11. FIG. 11 shows exemplary symbol-block repetitions 310–320 for user i and user j. Using Eq. (10) and Eq. (12), it can be shown that for user j, $$x_{lQ_i+q+\Delta}^j = d_{(q+\Delta)Q_j}^j \cdot c_{(lw_{ij}+\delta_j)_{L_j}}^j, \; \delta_j = \left\lfloor \frac{q+\Delta}{Q_j} \right\rfloor, \begin{array}{l} l = 0 \ldots (L_i - 1) \\ q = 0 \ldots (Q_i - 1) \end{array} \tag{13}$$

Using Eq. (13) in Eq. (11) and substituting $\Delta = -m$, an estimate of the transmitted $Q_i$ data symbols of user i using block modulation codes can be written as, $$\hat{d}_q^i = \sum_{j=1}^{K} \sum_{m} g_m^{ij} \cdot d_{(q-m)Q_j}^j \sum_{l=0}^{L_i-1} \cdot c_{(lw_{ij}+\delta_j)_{L_j}}^j c_{(l)L_i}^{i*} \tag{14}$$

$$q = 0 \ldots (Q_i - 1)$$

Now, let u and v be periodic sequences of length L. The periodic cross-correlation between u and v is given by, $$R_{uv}(\alpha) = \sum_{l=0}^{L-1} u_l \cdot v_{(l+\alpha)_L}^* \quad \alpha = 0 \ldots (L-1) \tag{15}$$

Defining, $$u_l^j = c_{(lw_{ij}+\delta_j)_{L_j}}^j \quad \text{and} \quad v_l^i = c_{(l)L_i}^{i*} \quad l = 0 \ldots (L_i - 1) \tag{16}$$

Eq. (14) can be re-written as, $$\hat{d}_q^i = \sum_{j=1}^{K} \sum_{m} g_m^{ij} \cdot d_{(q-m)Q_j}^j R_{uv}^{ji}(0) \quad q = 0 \ldots (Q_i - 1) \tag{17}$$

From Eq. (16), the sequence $u_l^j$ is the decimated version of $c_l^j$ by $w_{ij}$ with by $\delta_j$ being the decimation phase. Now, from Eq. (17), the condition for no MAI or orthogonal user discrimination, $$R_{uv}^{ji}(0) = \begin{cases} 0 & \forall \; i \neq j, \forall \; \delta_j \\ K, \; a \; \text{const} & i = j \end{cases} \tag{18}$$

That is, the zero lag component of the decimated periodic cross-correlation between the block modulation codes of the different data rate users must be zero for all decimation phases.

In the above analysis, it is assumed that user transmissions are received synchronously at the receiver (see Eq. (4)). For the case of asynchronous users (with cyclic extension being sufficiently long to tolerate worst case relative signal arrival delays between users and the channel pulse response duration), it can be shown that for no MAI, all lags (shifts) of the decimated periodic cross-correlation sequence must also be zero. Thus, in general, the condition for no MAI is, $$R_{uv}^{ji}(\alpha) = 0 \quad i \neq j, \forall \delta_j, \forall \alpha \tag{19}$$

Based on Eq. (19), the estimate of the transmitted $Q_i$ data symbols of user i using block modulation codes, Eq. (17), reduces to, $$\hat{d}_q^i = \sum_m g_m^{ii} \cdot d_{(q-m)Q_i}^i R_{uv}^{ii}(0) \quad q = 0 \ldots (Q_i - 1) \tag{20}$$

For ideal equalization (complete elimination of Inter-symbol interference—ISI) or in no multipath, $$g_m^{ii} = \begin{cases} K, \text{ a const } & m = 0 \\ 0 & m \neq 0 \end{cases} \tag{21}$$

$$\therefore \hat{d}_q^i = K \cdot d_{(q)Q_i}^i \quad q = 0 \ldots (Q_i - 1) \tag{22}$$

It can similarly be shown that if the condition in Eq. (19) is satisfied, no MAI results in the demodulation of the lower data rate user j Eq. (17).

Summarizing Eqs. (3), (12) and (19), the conditions for orthogonal user discrimination, and thus no MAI for different data rate users, in a multipath channel using block modulation codes defined in Eq. (8) are:

1. The repeated-symbol block duration of all users is the same, $N = Q_i L_i = Q_j L_j \; \forall i,j$
2. The data rate for all users is an integer multiple (K) or an integer reciprocal (1/K) of each other, $$Q_i = w_{ij} Q_j \text{ or } Q_i = \frac{1}{w_{ij}} Q_j, \sum_i Q_i \leq N, w_{ij} = \text{positive integer } \forall \, i, j$$

3. All lags (shifts) of the decimated periodic cross-correlation sequence between the channelization code vector, $c_{L_i,i}$ and $c_{L_j,j}$, of all users are zero, $R_{uv}^{ji}(\alpha) = 0 \; i \neq j, \forall \delta_j, \forall \alpha.$ Extension For Rational Multiple Data Rate Between Users The orthogonality conditions given above for block codes can be extended to support users with rational multiple data rates, i.e., rational symbol-block repetition factors as shown in FIG. 12 where, $$Q_i = w_{ij} Q_j \text{ or } L_j = w_{ij} L_i, \sum_i Q_i \leq N,$$

$w_{ij} = \text{positive rational number } \forall \, i, j.$

Figure 12:
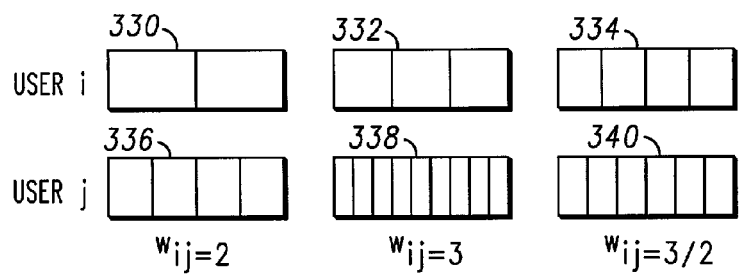
FIG. 12 illustrates exemplary symbol-block repetitions for multiple users of a system that employs rational multiple data rates.

Illustrated in FIG. 12 are examples of user i (330–334) and user j (336–340) symbol-block repetition within a repeated symbol-block. The support of rational multiple user data rates, such as $w_{ij}=3/2$ in FIG. 12, with orthogonal user discrimination improves the flexibility of the modulation to support a wide range of user data rate requirements. The following are the updated conditions for orthogonal user discrimination, and thus no MAI for different data rate users, in multipath channel using block modulation codes.

1. The repeated-symbol block duration of all users is the same, $N = Q_i L_i = Q_j L_j \; \forall i,j$.
2. The data rate for all users is a rational multiple of each other, $$Q_i = w_{ij} Q_j \text{ or } L_j = w_{ij} L_i, \sum_i Q_i \leq N,$$

$w_{ij} = \text{positive rational number } \forall \, i, j.$ positive rational number $\forall i,j$.

3. All lags (shifts) of the periodic cross-correlation sequence between the decimated channelization code vectors, $c_{L_i,i}$ and $c_{L_j,j}$, of all users must be zero for all possible decimation phases, $R_{uv}^{ji}(\alpha) = 0 \; i \neq j, \forall \delta_i, \delta_j, \forall \alpha.$ The decimation factor for each code vector is of the form, $$M_r = \frac{L_r}{\beta_{ij}}, \quad r = i, j$$

where $\beta_{ij} = \gcd(L_i, L_j)$ gcd=greatest common factor and $$u_l^j = c_{(lM_j + \delta_j)L_j}^j \text{ and } v_l^i = c_{(lM_i + \delta_i)L_i}^{i*} \quad l = 0 \ldots (\beta_{ij} - 1)$$

where $\delta_i$ and $\delta_j$ are the decimation phases and $$R_{uv}^{ji}(\alpha) = \sum_{l=0}^{\beta_{ij}-1} u_l^j \cdot v_{(l+\alpha)\beta_{ij}}^{i*} \quad \alpha = 0 \ldots (\beta_{ij} - 1).$$

Block Channelization Codes

Referring again to the conditions for orthogonal user discrimination, a particular family of channelization codes that satisfies the orthogonality requirement of condition #3, is based on the rows of the L-dimensional discrete Fourier transform (DFT) matrix ($C_L$), $$C_L = \begin{bmatrix} 1 & 1 & 1 & \cdots & 1 \\ 1 & W^1 & W^2 & \cdots & W^{(L-1)} \\ 1 & W^2 & W^4 & \cdots & W^{2(L-1)} \\ \vdots & \vdots & \vdots & \ddots & \vdots \\ 1 & W^{(L-1)} & W^{2(L-1)} & \cdots & W^{(L-1)(L-1)} \end{bmatrix} = \begin{bmatrix} c_{L,0} \\ c_{L,1} \\ c_{L,2} \\ \vdots \\ c_{L,L-1} \end{bmatrix} \quad \begin{array}{l} L = 1 \ldots N \\ W = e^{-j2\pi/L} \end{array} \quad (23)$$

By proper assignment of the DFT-based channelization codes, $c_{L,k}$, orthogonal user discrimination in a multipath channel can be achieved with different data rate users satisfying condition #2, however a large number of assignments are possible. Examples of a few channelization code assignments using code tree structures 350–380 are shown in FIG. 13.

Figure 13:
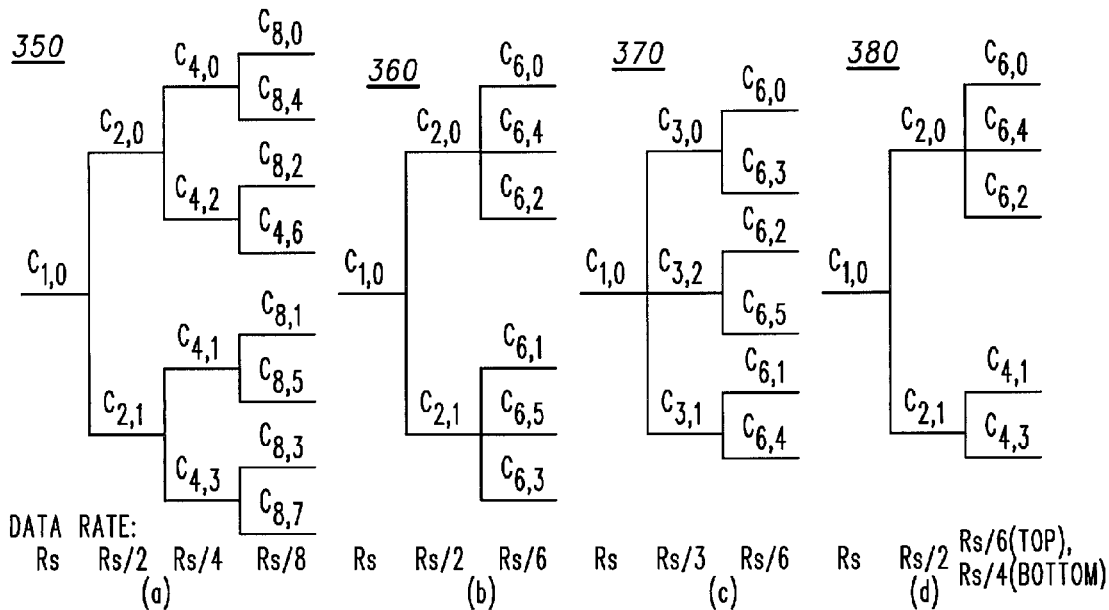
FIG. 13 shows code trees illustrating exemplary channelization code assignments for block modulation codes.

As can be seen from the example code trees 350–380 in FIG. 13, a wide range of data rates is possible in principle by subdividing each node in a tree (at a particular stage) into b branches. The data rate achieved by each subsequent branch is then b times smaller than that of its parent. Thus, users with different data rate requirements can be supported by proper assignment of one of the channelization codes subject to the following rules and constraints:

1. When a specific code is used, no other code on the path from that code to the root and on the sub-tree beneath that code can be used, and
2. All the codes at any depth into the tree are the set of DFT basis functions ($C_L = \{C_{L,k}\}$) for that dimension (L).

Figure 14:
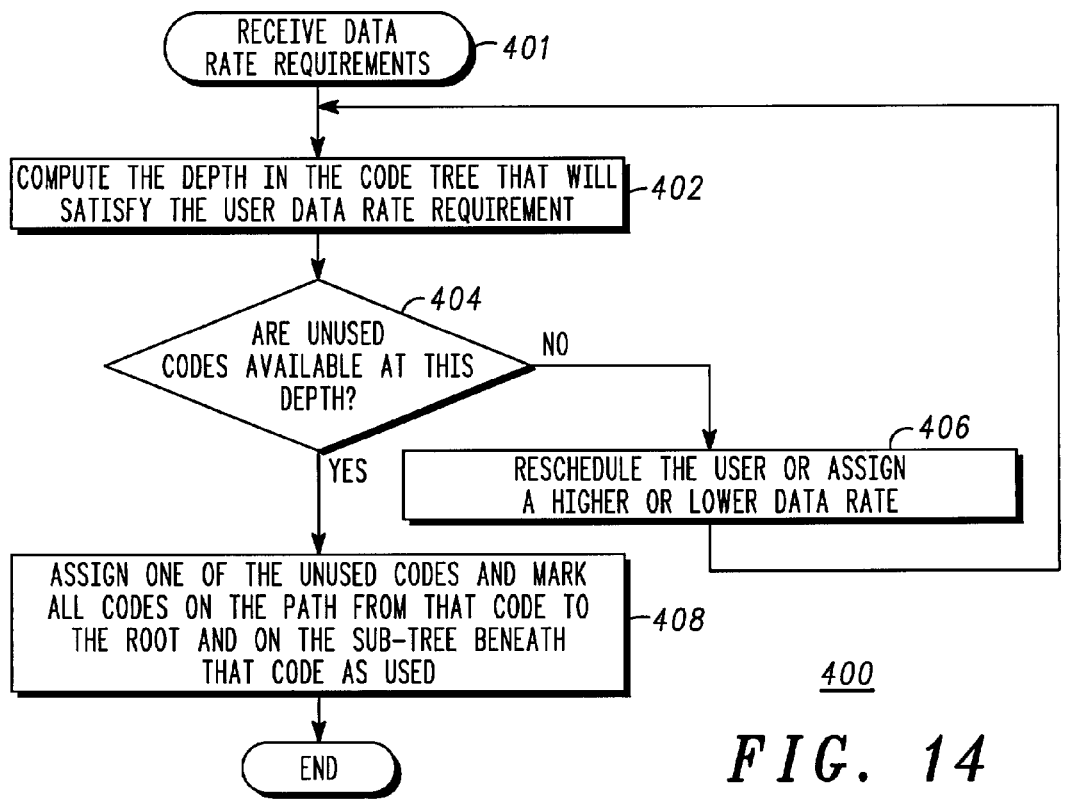
FIG. 14 is a flow chart of a method of channelization code assignment.

FIG. 14 shows a flow chart 400 outlining a method for channelization code assignment. In step 401, a user data rate requirement is received. In step 402, the depth in the code tree that satisfies the user data rate requirement is determined. In decision step 404, a check is made to determine whether any unused codes are currently available at the requested data rate. If so, the user is assigned to an available code, and all codes on the path from the assigned code to the root and all codes on the sub-tree beneath the assigned code are marked as unavailable (step 408).

If no codes are available at the requested rate, the user can be re-scheduled for transmission at a later time, or alternatively, the user can be assigned a code corresponding to a higher or lower data rate (step 406).

Phase Ramp Modulation Codes

The analysis for phase ramp modulation codes is similar to that described above herein for block modulation codes. Let the modulation code for user i, $b_l^i$, be of the following form, $$b_l^i = e^{-jl\theta_i}, \quad l = -v \ldots (N-1) \quad (24)$$

where the properties (and values) of the channelization code $\theta_i$ needed for orthogonal user discrimination are to be determined. From Eq. (24), the phase of the modulation codes for user i, $b_l^i$, increase linearly throughout the symbol duration. Thus, from Eqs. (2) and (24), $$x_{lQ_i+q}^i = d_q^i \cdot b_{lQ_i+q}^i = d_q^i \cdot \exp[-j(lQ_i+q)\theta_i] \quad (25)$$
$$l = 0 \ldots (L_i - 1), \quad q = 0 \ldots (Q_i - 1)$$

$$\text{or, } x_l^i = d_{(l)_{Q_i}}^i e^{-jl\theta_i} \quad l = 0 \ldots (N-1) \quad (26)$$

where, $(a)_b = a \mod b$.

Using Eq. (24) in Eq. (7), an estimate of the transmitted $Q_i$ data symbols of user i using phase ramp modulation codes can be written as, $$\hat{d}_q^i = \sum_{j=1}^{K} \sum_m g_m^{ij} \sum_{l=0}^{L_j-1} x_{lQ_i+q-m}^j \cdot (e^{-j(lQ_i+q)\theta_i})^* \quad q = 0 \ldots (Q_i - 1) \quad (27)$$

Now, like block modulation codes, consider the case where the data rate of user i is an integer multiple of user j, i.e., $$Q_i = w_{ij} Q_j \quad w_{ij} = \text{positive integer} \quad (28)$$
$$L_j = w_{ij} L_i$$

Thus, from Eq. (28), since the repeated symbol-block duration (N) is the same for all users, the number of symbol-block repetitions for user i ($L_i$) is $w_{ij}$ times smaller than that for user j ($L_j$) as was shown in FIG. 11.

Using Eq. (26) and Eq. (28), it can be shown that for user j, $$x_{lQ_i+q+\Delta}^j = d_{(q+\Delta)_{Q_j}}^j e^{-j(lQ_i+q+\Delta)\theta_j} \quad (29)$$

Using Eq. (29) in Eq. (27) and substituting $\Delta = -m$, an estimate of the transmitted $Q_i$ data symbols of user i using phase ramp modulation codes can be written as, $$\hat{d}_q^i = \sum_{j=1}^{K} \sum_m g_m^{ij} \cdot d_{(q-m)_{Q_j}}^j \sum_{l=0}^{L_j-1} \cdot e^{-j(lQ_i+q-m)\theta_j} \cdot e^{j(lQ_i+q)\theta_i} \quad (30)$$
$$q = 0 \ldots (Q_i - 1)$$

or, $$\hat{d}_q^i = \sum_{j=1}^{K} \sum_m g_m^{ij} \cdot d_{(q-m)_{Q_j}}^j \cdot e^{jm\theta_j} e^{jq(\theta_i - \theta_j)} \cdot \sum_{l=0}^{L_j-1} \cdot e^{jlQ_i(\theta_i - \theta_j)} \quad (31)$$
$$q = 0 \ldots (Q_i - 1)$$

From Eq. (31), the condition for no MAI or orthogonal user discrimination is, $$\sum_{l=0}^{L_i-1} \cdot e^{jlQ_i(\theta_i - \theta_j)} = \begin{cases} 0 & \forall\, i \neq j \\ K & i = j \end{cases} \forall\, Q_i \quad (32)$$

From Eq. (32), the estimate of the transmitted $Q_i$ data symbols of user i using phase ramp modulation codes satisfying Eq. (31) reduces to, $$\hat{d}_q^i = K \sum_m g_m^{ii} \cdot d_{(q-m)Q_i}^i e^{jm\theta_i} \quad (33)$$

$$q = 0 \ldots (Q_i - 1)$$

For ideal equalization (complete elimination of Inter-symbol interference—ISI) or in no multipath as indicated by Eq. (21), $$\hat{d}_q^i = K \cdot d_{(q)Q_i}^i \quad (34)$$

$$q = 0 \ldots (Q_i - 1)$$

It can likewise be shown that if the condition in Eq. (32) is satisfied, no MAI results in the demodulation of the lower data rate user j (Eq. (28)).

Thus, in summary, from Eqs. (3), (28) and (32), the conditions for orthogonal user discrimination, and thus no MAI, in a multipath channel for different data rate users using phase ramp modulation codes defined in Eq. (24) are:
1. The repeated symbol-block duration of all users is the same, $N = Q_i L_i = Q_j L_j$ $\forall$ i,j.
2. The data rate for all users is an integer multiple (K) or an integer reciprocal (1/K) of each other, $$Q_i = w_{ij} Q_j \text{ or } Q_i = \frac{1}{w_{ij}} Q_j$$

$$w_{ij} = \text{positive integer } \forall\, i, j, \sum_i Q_i \leq N.$$

3. The modulation (and hence channelization) codes for all users must satisfy, $$\sum_{l=0}^{L_j-1} e^{jlQ_i(\theta_i - \theta_j)} = \begin{cases} 0 & \forall\, i \neq j \\ K & i = j \end{cases} \forall\, Q_i.$$

Extension For Rational Multiple Data Rate Between Users

As for block modulation codes, the orthogonality conditions given above for phase ramp codes can be extended to support users with rational multiple data rates, i.e., rational symbol-block repetition factors as was shown in FIG. 12. The support of rational multiple user data rates with orthogonal user discrimination improves the flexibility of the modulation to support a wide range of user data rate requirements. The following are the updated conditions for orthogonal user discrimination, and thus no MAI for different data rate users, in a multipath channel using phase ramp modulation codes:
1. The repeated-symbol block duration of all users is the same, $N = Q_i L_i = Q_j L_j$ $\forall$ i,j.
2. The data rate for all users is a rational multiple of each other, $$Q_i = w_{ij} Q_j \text{ or } L_j = w_{ij} L_i, \sum Q_i \leq N,$$

$$w_{ij} = \text{positive rational number } \forall\, i, j$$

3. The modulation (and hence channelization) codes for all users must satisfy, $$\sum_{l=0}^{\beta_{ij}-1} e^{jlQ_i(\theta_i - \theta_j)} = \begin{cases} 0 & \forall\, i \neq j \\ K & i = j \end{cases} \forall\, Q_i,$$

$K = $ constant where $\beta_{ij} = gcd(L_i, L_j)$ $gcd = $ greatest common factor.

Phase Ramp Channelization Codes

Channelization codes that satisfy the orthogonality requirement in condition 3 above are of the following form, $$\theta_i = \theta_{L_i, i} = \frac{2\pi i}{Q_i L_i} = \frac{2\pi i}{N} \quad (35)$$

Thus, by proper assignment of the channelization codes, $\theta_{L_i, i}$, orthogonal user discrimination in a multipath channel can be achieved for different data rate users satisfying condition 2. However, similar to block modulation codes, there are a large number of code assignments possible. Examples of a few channelization code assignments using code tree structures 420–450 are shown in FIG. 15.

Figure 15:
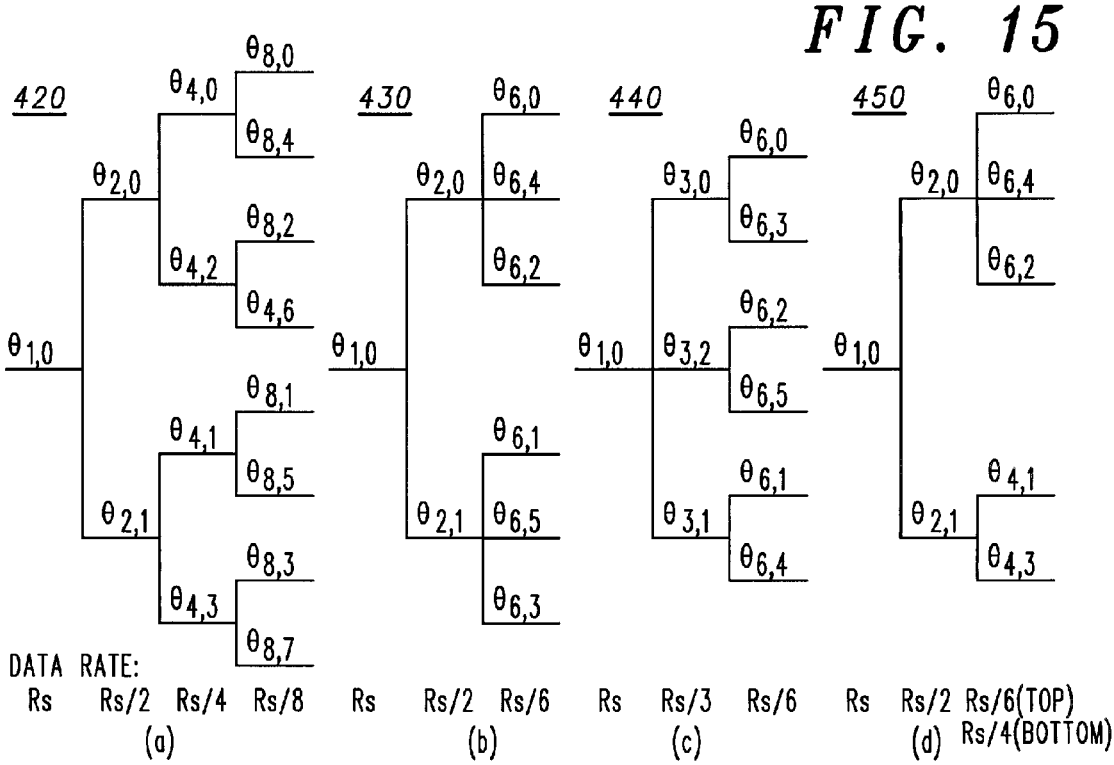
FIG. 15 shows code trees illustrating exemplary channelization code assignments for phase ramp modulation codes.

As can be seen from the examples in FIG. 15, a wide range of data rates is possible by subdividing each node in the tree (at a particular stage) into b branches. The data rate achieved by each subsequent branch is then b times lower than that of its parent branch. Thus, users with different data rate requirements can be supported by proper assignment of one of the channelization codes subject to the following rule:
"When a specific code is used, no other code on the path from that code to the root and on the sub-tree beneath that code can be used."

The flow chart 400 of FIG. 14 shows a method of channelization code assignment that is the same for block and phase ramp modulation codes.

The conditions derived above for orthogonal user discrimination using block and phase ramp modulation codes are also valid for the inverse order of operations in receivers, namely, code correlation followed by equalization as in FIG. 8. In addition, it is possible to equalize all the users at once using frequency domain equalization techniques.

Asynchronous Users

Figure 16:
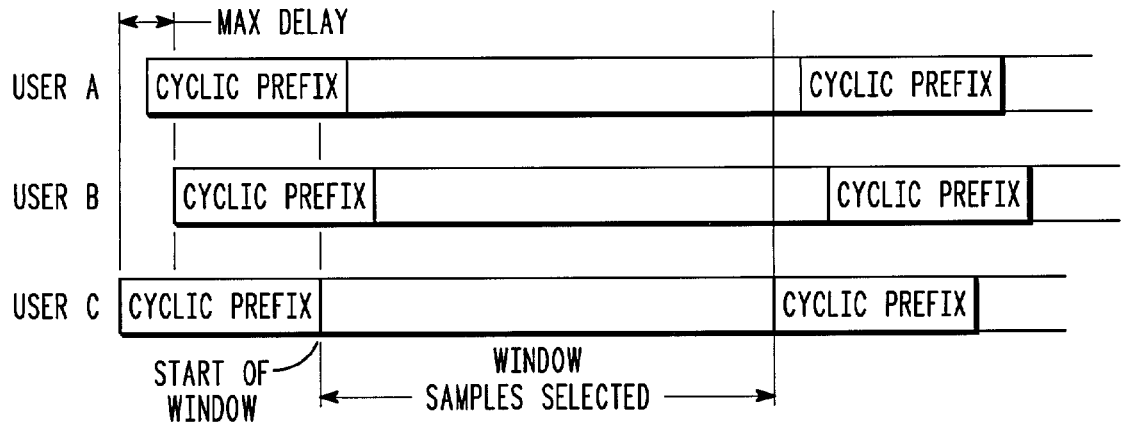
FIG. 16 illustrates the relative temporal positions of asynchronous transmissions received by a receiver includable in the system of FIG. 1.

For the case of asynchronous users, an additional guard period of length greater than the worst-case relative signal arrival delays between users ($P_D$) is required in order to maintain orthogonality. The receiver then selects the appropriate temporal position (window) of the N symbol samples (assuming 1× oversampling) that are free from multiple access interference (MAI) for all users. FIG. 16 shows an example for the case of three asynchronous users.

It can be shown that for a cyclic extension of length v and relative delays/advance, $\Delta_i$, of user i with respect to a reference user, e.g. user A, possible starting positions, $\Delta$, of the MAI free temporal window (with respect to the reference user) satisfy the following relation, $$\Delta_{max}+v \leq \Delta \leq P_D+\Delta_{min}+v, \Delta_{max}=\max(\Delta_i), \Delta_{min}=\min(\Delta_i) \quad (36)$$

Thus, from Eq. (36), multiple uncorrupted N-symbol sample windows are possible for the case when the relative delays are less than the maximum delay, $P_D$. The receiver can select any one of these sampling instances for further processing.

Figure 17:
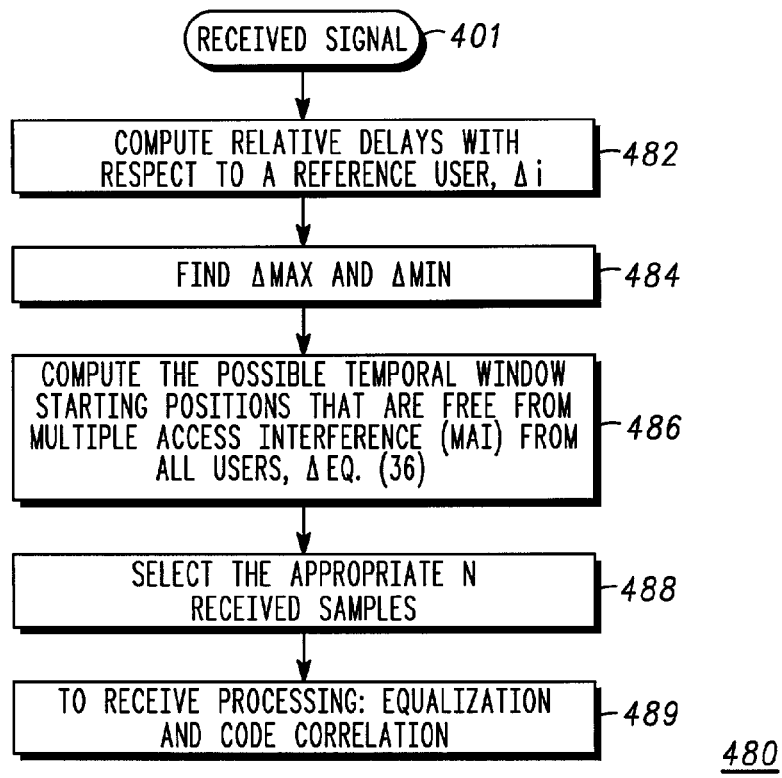
FIG. 17 is a flow chart illustrating a method of processing asynchronous transmissions.

FIG. 17 shows a flow chart 480 for the temporal window selection process for the case of asynchronous users. In step 401, a signal is received by the receiver 104. In step 482, relative delays are computed for the users relative to a reference user. From these relative delays, a minimum delay and a maximum delay are determined (step 484). In step 486, possible temporal starting points of a window free of MAI is determined. In step 488, samples from the window are selected. In step 489, these samples are provided to the equalization and code correlation functions of the receiver, as described in connection with FIGS. 5–8.

Additional redundant samples can be used as side information to improve the received signal-to-noise ratio, and thus, the detector performance in the receiver. It should also be noted that a user dependent rotation of demodulated data symbols can be used prior to forward error correction decoding.

An alternative method for achieving multirate users is to assign more than one code to a particular user and linearly combine the individual code modulated signals. However, such a scheme could suffer from large peak-to-average ratio due to linear addition of the modulation signals. In addition, other multiple access protocols, such as time division multiple access (TDMA) or code division multiple access (CDMA) protocols, can be used in conjunction with or run on top of the multi-rate IFDMA scheme described herein.

While specific embodiments of the present invention have been shown and described, it will apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

We claim:

1. A method of modulating a signal, comprising:
    determining a data rate from a plurality of data rates;
    modulating the signal using an interleaved frequency division multiple access (IFDMA) modulation scheme wherein the modulated signal is characterized by having an IFDMA block repetition value dependent on the data rate;
    transmitting the IFDMA modulated signal; and
    applying a modulation code for the signal, wherein the modulation code is one of a block modulation code based on an L-dimensional discrete Fourier transform (DFT) matrix defining a channelization code, and a phase ramp modulation code.

2. The method of claim 1, further comprising, varying the data rate of the modulated signal based on the channel conditions of a channel used by the communication system.

3. The method of claim 1, wherein the modulation code is selected based on a code tree.

4. The method of claim 1, wherein the data rates are selected using a code tree.

5. An apparatus, comprising:
    a transmitter modulating a signal at a selected one of a plurality of data rates using an interleaved frequency division multiple access (IFDMA) modulation scheme, wherein the transmitter includes, means for applying a user-specific symbol block repetition value in the IFDMA modulation scheme; wherein the transmitter includes means for adding a cyclic extension to the signal, and wherein the cyclic extension has a length greater than the sum of a relative signal arrival delay between a plurality of users and the channel pulse response duration.

6. The apparatus of claim 5, wherein the transmitter includes, means for applying a user-specific modulation code in the IFDMA modulation scheme.

7. A method of demodulating a signal, comprising:
    equalizing the signal;
    correlating the equalized signal with a predetermined modulation code;
    combining block repetitions of the correlated signal; and
    detecting one or more symbols based on the combined block repetitions.

8. The method of claim 7, further comprising, filtering the signal.

9. The method of claim 7, further comprising, performing an A/D conversion on the signal.

10. The method of claim 7, further comprising, removing a cyclic extension.

11. The method of claim 7, wherein the step of equalizing includes a step selected from the group consisting of: performing a frequency domain equalization, performing a time-domain equalization, performing a decision feedback equalization, performing an iterative equalization, performing an ISI cancellation, performing a turbo equalization, and performing a maximum likelihood sequence estimation.

12. The method of claim 7, wherein the modulation code is selected from a group consisting of a block modulation code and a phase ramp modulation code.

13. A method of demodulating a signal, comprising:
    correlating the signal with a predetermined modulation code;
    combining block repetitions of the correlated signal; and
    detecting one or more symbols based on the combined block repetitions.

14. The method of claim 13, further comprising, filtering the signal.

15. The method of claim 13, further comprising, performing an A/D conversion on the signal.

16. The method of claim 13, further comprising, removing a cyclic extension.

17. The method of claim 13, wherein the modulation code is selected from the group consisting of a block modulation code and a phase ramp modulation code.

18. The method of claim 13, further comprising, equalizing the combined block repetitions.

19. The method of claim 18, wherein the step of equalizing includes a step selected from the group consisting of: performing a frequency domain equalization, performing a time-domain equalization, performing a decision feedback equalization, performing an iterative equalization, performing an ISI cancellation, performing a turbo equalization, and performing a maximum likelihood sequence estimation.

20. A receiver, comprising:
an equalizer for equalizing an input signal;
a correlator, operatively couple to the equalizer, for correlating the equalized signal using a predetermined modulation code; and
a block combiner, operatively coupled to the correlator, for combining block repetitions of the correlated signal.

21. The receiver of claim 20, further comprising, an intermediate frequency (IF) filter, operatively coupled to the equalizer, for filtering the signal prior to it being equalized.

22. The receiver of claim 20, further comprising, an A/D converter for performing an A/D conversion on the signal.

23. The receiver of claim 20, further comprising, means for removing a cyclic extension.

24. The receiver of claim 20, wherein the equalizer performs an equalization selected from the group consisting of: a frequency domain equalization, time-domain equalization, decision feedback equalization, iterative equalization, ISI cancellation, turbo equalization, and maximum likelihood sequence estimation.

25. The receiver of claim 20, wherein the modulation code is selected from the group consisting of a block modulation code and a phase ramp modulation code.

26. The receiver of claim 20, further comprising, a detector, responsive to the output of the block combiner, for detecting one or more symbols based on the combined block repetitions.

27. A receiver, comprising:
a correlator for correlating a signal using a predetermined modulation code;
a block combiner, operatively coupled to the correlator, for combining block repetitions of the correlated signal; and
an equalizer, operatively coupled to the block combiner, for equalizing the output of the block combiner.

28. The receiver of claim 27, further comprising, an intermediate frequency (IF) filter for filtering the signal prior to it being correlated.

29. The receiver of claim 27, further comprising, an A/D converter for performing an A/D conversion on the signal.

30. The receiver of claim 27, further comprising, means for removing a cyclic extension.

31. The receiver of claim 27, wherein the equalizer performs an equalization selected from the group consisting of: a frequency domain equalization, time-domain equalization, decision feedback equalization, iterative equalization, ISI cancellation, turbo equalization, and maximum likelihood sequence estimation.

32. The receiver of claim 27, wherein the modulation code is selected from a block modulation code and a phase ramp modulation code.

33. The receiver of claim 27, further comprising, a detector, responsive to the equalized signal, for detecting one or more symbols based on the equalized combined block repetitions.

34. The method of claim 1 wherein the step of modulating the signal using the IFDMA modulation scheme additionally comprises the step of using a Code Division Multiple Access (CDMA) protocol in conjunction with the IFDMA modulation scheme.

35. The method of claim 1, wherein the modulation code is selected to maintain orthogonality between signals modulated at different data rates.

36. The apparatus of claim 6, wherein the user-specific modulation code is selected to maintain orthogonality between signals modulated at different data rates.

37. The apparatus of claim 6, wherein the user-specific modulation code is one of a block modulation code based on an L-dimensional discrete Fourier transform (DFT) matrix defining a channelization code, and a phase ramp modulation code.

38. The method of claim 5, wherein the data rates are selected using a code tree.

39. An apparatus, comprising:
a transmitter modulating a signal at a selected one of a plurality of data rates using an interleaved frequency division multiple access (IFDMA) modulation scheme, wherein the transmitter includes, means for applying a user-specific symbol block repetition value in the IFDMA modulation scheme, wherein the transmitter includes, means for applying a user-specific modulation code in the IFDMA modulation scheme; and
wherein the user-specific modulation code is one of a block modulation code based on an L-dimensional discrete Fourier transform (DFT) matrix defining a channelization code, or a phase ramp modulation code.

40. The method of claim 39, wherein the data rates are selected using a code tree.

41. The apparatus of claim 39, wherein the transmitter includes a pulse-shaping filter.

42. The apparatus of claim 39, wherein the transmitter includes means for adding a cyclic extension to the signal.

43. The apparatus of claim 42, wherein the cyclic extension has a length greater than the sum of a relative signal arrival delay between a plurality of users and the channel pulse response duration.

* * * * *